United States Patent Office 3,449,741
Patented June 10, 1969

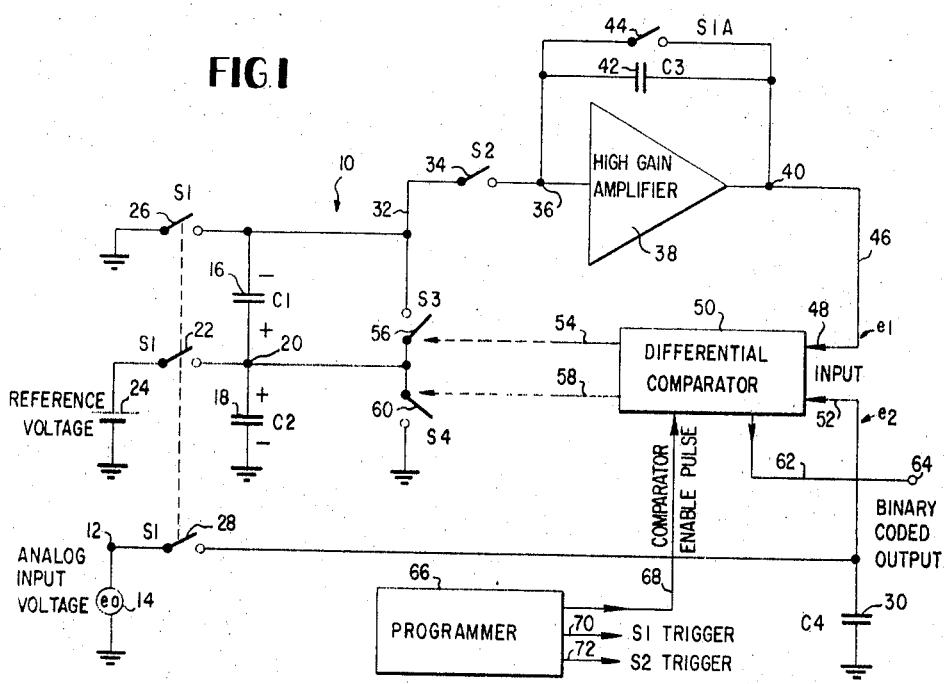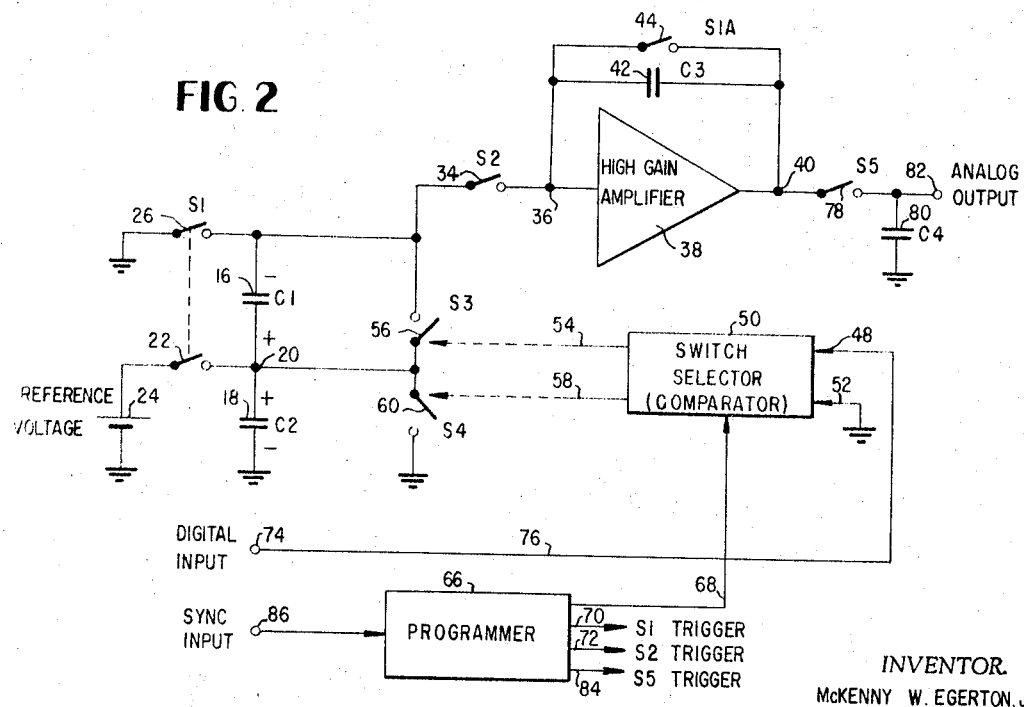

3,449,741
REVERSIBLE ANALOG-DIGITAL CONVERTER UTILIZING INCREMENTAL DISCHARGE OF SERIES CONNECTED CHARGE SHARING CAPACITORS
McKenny W. Egerton, Jr., Owings Mills, Md., assignor to Towson Laboratories, Inc., Baltimore, Md., a corporation of Maryland
Continuation-in-part of application Ser. No. 250,369, Jan. 9, 1963. This application Feb. 8, 1965, Ser. No. 437,615
Int. Cl. H03k 13/254
U.S. Cl. 340—347   13 Claims

ABSTRACT OF THE DISCLOSURE

Disclosed is a signal generator for analog to digital and digital to analog converters and a reversible converter incorporating the generator. The generator comprises a pair of equal capacitors which share charge in binarily decreasing increments. The capacitors are simultaneously charged to equal potentials and then one is discharged depending on the polarity of the signal to be generated. The capacitors are then connected in series between a reference potential and a charge transfer amplifier having a feedback capacitor such that a charge is developed on the feedback capacitor at the same time it is shared between the equal capacitors. The sequence is repeated through a complete encoding cycle to build up a signal on the feedback capacitor.

---

This application is a continuation-in-part of copending application Ser. No. 250,369 filed Jan. 9, 1963 now abandoned.

This invention relates to electronic converters and more particularly to a simplified reversible analog to digital converter involving capacitive charge transfer.

Analog to digital and digital to analog converters are well known. Such converters are useful in a wide variety of applications such as in the field of telemetry for transferring the analog output of various types of transducers including accelerometers, air speed meters and the like into electrical pulses and for converting electrical pulses into analog quantities which represent the original information measured. Electronic converters are also used for voice encoding and for voice communication in which applications they provide a communication system with superior fidelity and other desirable characteristics. Additional applications for converters involve electrically driven machinery, particularly machine tools.

In the converters of the present invention the input is received as an electrical quantity in the form of a voltage or current or other signal. The output of the analog to digital converter may take many forms. One form is electrical pulses in serial time relationship. Other forms include the condition of electrical or magnetic quantities in flip-flops or magnetic cores. Still other forms of output are mechanical such as counters or registers or the setting of relays. The outputs of the digital to analog converters are electromagnetic signals such as voltages or currents or the like which vary with time.

For voice encoding and certain other applications it has been found desirable to employ delta or differential type converters sometimes called delta PCM modulators. The converters of the present invention are suitable for use as delta converters and can by a simplified switching arrangement be reversed from analog to digital conversion on the one hand, and to digital to analog conversion on the other.

It is therefore a primary object of the present invention to provide a novel analog to digital converter.

Another object of the present invention is to provide a novel digital to analog converter.

Another object of the present invention is to provide a reversible analog to digital converter.

Another object of the present invention is to provide a simplified electronic converter.

Another object of the present invention is to provide an electronic converter suited for delta conversion.

These and other objects and advantages of the invention will be more apparent upon reference to the following specification, claims and appended drawings wherein:

FIGURE 1 is a block diagram of the analog to digital form of the converter of the present invention;

FIGURE 2 shows the converter of FIGURE 1 connected for digital to analog conversion;

Figure 3:
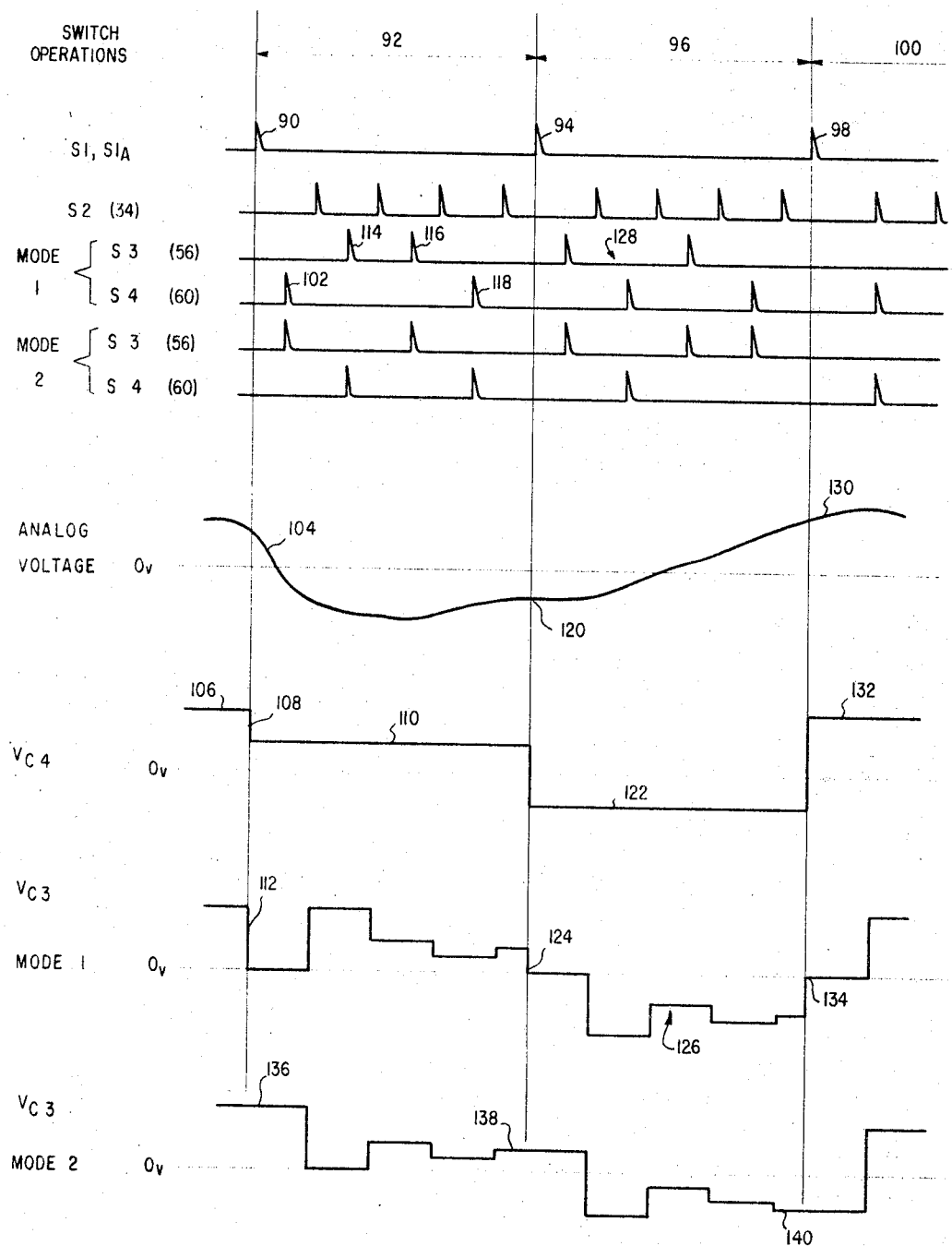
FIGURE 3 shows pulse and waveform diagrams for the converter of FIGURE 1.

Referring to the drawings, the converter of the present invention generally indicated at 10 in FIGURE 1 is shown connected for analog to digital conversion and includes an input terminal 12 connected to a source of analog input voltage 14 such as a strain gauge, pressure transducer or the like.

The converter includes a pair of capacitors 16 and 18 labelled $C_1$ and $C_2$ respectively, connected together at junction 20. One side of capacitor 18 is connected to ground and the other side of this capacitor is connected through switch 22 labelled $S_1$ to a reference voltage source indicated by battery 24. The other side of battery 24 is grounded.

One side of capacitor 16 is also connected to ground through switch 26 also labelled $S_1$. A third switch 28 similarly labelled $S_1$ connects input terminal 12 to a storage capacitor 30 labelled $C_4$, the other side of which is grounded. As indicated by the dashed lines, switches 22, 26 and 28 are ganged together.

Capacitor 16 is connected by way of lead 32 through a switch 34 labelled $S_2$ to the input terminal 36 of an operational amplifier 38 of the Miller integrator type having a high negative gain ideally approaching infinity. Connected between the output terminal 40 and input terminal 36 of operational amplifier 38 is a feedback capacitor 42 labelled $C_3$. A shorting switch 44 labelled $S_{1a}$ is connected across capacitor 42.

The output terminal 40 of operational amplifier 38 is connected by way of lead 46 to one input 48 of a comparator 50. The other input 52 of the comparator is connected to capacitor 30. The output of the comparator 50 appearing on output line 54 controls a shorting switch 56 labelled $S_3$ connected across capacitor 16. A second comparator output appearing on output line 58 controls shorting switch 60 labelled $S_4$ connected across capacitor 18. The digital output appearing on either one of the lines 54 or 58 may be taken from the comparator by way of lead 62 to digital output terminal 64.

A programmer 66 supplies enabling pulses to the comparator 50 by way of lead 68. Suitable programmer trigger pulses are also supplied by way of leads 70 and 72 from the programmer to the switches $S_1$ and $S_2$.

FIGURE 2 shows the converter of FIGURE 1 connected for digital to analog conversion. The basic signal generator portion of the converter is identical to that shown in FIGURE 1 and like parts bear like reference numerals.

The principal difference in the circuit of FIGURE 2 is that the known pulse train of digital information is supplied to digital input terminal 74 and by way of lead 76 to input terminal 48 of the comparator. The other input terminal 52 of the comparator is grounded. The analog output is taken from output terminal 40 of operational amplifier 38 by way of switch 78 labelled $S_5$ and capacitor 80 labelled $C_4$ to analog output terminal 82. Programmer 66 supplies program trigger pulses to switch 78 by way of an additional lead 84. The programmer is shown as controlled by a synchronizing input at terminal 86.

In operation for conventional analog to digital conversion utilizing the circuit of FIGURE 1 the momentary closure of switch $S_1$ charges capacitors 16 and 18 each to the reference voltage of source 24 with the polarities indicated and capacitor 30 to the analog input voltage. The closure of switch 44 labelled $S_{1a}$ at this time discharges capacitor 42 to zero volts. For binary conversions it is necessary that capacitors 16 and 18 be equal, that is, $C_1$ equals $C_2$. For ease of description it will be assumed that all capacitors $C_1$ through $C_4$ in FIGURES 1 and 2 are equal although it is only necessary for correct binary operation of the circuit that capacitors 16 and 18 be of equal capacity.

The closure of switches $S_1$ and $S_{1a}$ is illustrated in the timing pulse and waveform diagram of FIGURE 3 at 90. This pulse from the programmer initiates a first encoding period 92. A later pulse 94 from the programmer initiates a second encoding period 96 and subsequent pulses such as third pulse 98 from the programmer initiates third encoding period 100.

A second pulse from the programmer enables the comparator to operate either switch 56 or 60 depending upon the polarity of the analog input voltage source 14. If the comparator input voltage on the terminals 48 and 52 is positive as shown, that is, $e_1-e_2$ is positive, an output pulse appears on lead 58 and switch 60 operates. This is indicated at 102 in FIGURE 3. If the comparator input voltage $(e_1-e_2)$ is negative an output pulse appears on lead 54 and switch 56 operates.

The analog input voltage is shown by the arbitrary waveform 104 in FIGURE 3. This is sampled across capacitor 30 at the beginning of each encoding period as determined by the programming closures of switches $S_1$ and $S_{1a}$ as indicated by the pulses 90, 94 and 98. Prior to the first encoding period the voltage on capacitor 30 is indicated as at some arbitrary value 106, determined by the preceding operations of the circuit. The closure of switch $S_1$ at 90 causes capacitor 30 to sample the analog voltage 104 so that the capacitor voltage falls as indicated at 108 to the value 110 which is the value of the analog voltage 104 at the time switch $S_1$ is closed. At the same time the closure of switch $S_{1a}$ discharges capacitor 42 labelled $C_3$ to zero as indicated at 112 in FIGURE 3.

Since the analog input voltage during the first closure of switch $S_1$ is indicated as positive, the potential on input 52 to the comparator 50 is positive while the potential of input 48 to the comparator is zero since capacitor 42 has been discharged by the closure of switch 44. As a result of the positive analog input voltage switch 60 is the first to close as indicated at 102.

The temporary closure of switch 60 discharges capacitor 18 to zero potential since it produces a short circuit across the capacitor.

A subsequent programming pulse on line 72 causes switch 34 labelled $S_2$ to temporarily close connecting capacitors 16 and 18 in series to the input terminal 36 of operational amplifier 38. Since the input terminal 36 of the operational amplifier is a virtual ground capacitor 16 will partially discharge through capacitor 18 and this discharging current also flows through feedback capacitor 42. The potential across capacitor 42 in turn appears as a positive output potential at terminal 40 of the operational amplifier.

Since capacitor 16 was previously charged by battery 24 to the reference potential E of the battery, half of the charge on this capacitor is transferred to capacitor 18 leaving capacitors 16 and 18 each charged to potential $E/2$.

A second programming pulse appears on line 68 from the programmer and enables comparator 50. Assuming that the analog input voltage on input terminal 52 is now less than the voltage $E/2$ appearing at output terminal 40 and hence at comparator input terminal 48 the comparator will produce an output pulse on line 54 instead of line 58 to close switch 56. This temporary closure is indicated at 114 in FIGURE 3. As a result of the closure of the switch 56 capacitor 16 is shorted to zero potential.

A second programmer pulse appears on line 72 to close switch 34 for the second time, and half of the charge on capacitor 18 is transferred by way of the virtual ground at input terminal 36 to capacitor 16. The capacitors 16 and 18 each reach a potential of $E/4$ and the discharging current for capacitor 18 is integrated by capacitor 42. However, since the current flow is in the opposite direction from that in the previous bit period where capacitor 16 was discharging, the polarity of the voltage change across capacitor 42 is reversed and the potential across this capacitor drops from $E/2$ to $E/4$.

If the analog input voltage is still less than the amplifier output, comparator 50 will again produce an output on line 54 closing switch 56. This is indicated at 116. The closure of switch 56 again discharges capacitor 16 and the later closing of switch 34 causes the output potential at 40 to drop to $E/8$.

If the analog input voltage is greater than $E/8$ the next closure will be that of switch 60 as indicated at 118. Closure of switch 60 discharges capacitor 18 and the subsequent closure of switch 34 causes the potential across capacitor 42 and hence that of output terminal 40 to rise to $3E/16$.

As can be seen capacitor 42 can be charged in either polarity by switch 34 depending on whether switch 56 or 60 was closed and the output potential at terminal 40 as a result changes in binarily decreasing steps towards the value of the analog input voltage across capacitor 30. The comparator controls the polarity of each increment transferred to capacitor 42 in such a way as to make the voltage across capacitor 42 and hence at output terminal 40 at the end of an encoding period as nearly equal to the voltage across capacitor 30 as possible. This encoding sequence can be followed for as many bits as required to give the desired accuracy. As a result the comparator decisions constitute a serial binary code representing the voltage on capacitor 30 which is the value of the analog input voltage at the time the sample is taken by the switch $S_1$. The digital output may be taken from either comparator output line 54 or from output line 58 since the output on one of these two lines is the complement of the output on the other line. The digital output is indicated in FIGURE 1 as derived internally of the comparator from line 54 by way of lead 62 to an output terminal 64. Consequently the serial binary output can be represented by the pulses closing switch 56 as indicated at 114 and 116 in FIGURE 3.

A second encoding cycle is initiated with the closing of switch $S_1$ as indicated at 94 at which time the analog voltage is negative as indicated at 120. The voltage across capacitor 30 drops from positive value 110 to a negative value 122 and capacitor 42 is discharged as indicated at 124. The voltage across capacitor 42 again changes in binarily decreasing increments as indicated at 126 towards the value of the analog input voltage 122. The output pulse train is indicated again by the pulse positions representative of the operation of switch 56 as indicated at 128.

A third encoding cycle or period is initiated by third closing of switches $S_1$ and $S_{1a}$ at 98 with the analog input voltage again at a positive value of 130. The voltage across capacitor 30 rises to a positive value 132 which corresponds to the value of the analog input voltage at 130, that is the value of the analog input voltage at the time of the pulse 98. As before, capacitor 42 is discharged as shown at 134 which is an indication of the initiation of the third encoding period.

The operation of the embodiment of FIGURE 2 for digital to analog conversion is similar to that of FIGURE 1. A known digital input pulse train is applied to input terminal 74 of FIGURE 2 and is compared with the ground at the other input terminal 52 of the comparator. The presence or absence of a pulse at a pulse position in the input train acts to produce a pulse on either line 54 or 58 respectively so as to close either switch 56 or 60. As a result a potential builds up in binarily decreasing steps to appear at output terminal 40 as an analog voltage representative of the digital pulse input. By means of the closure of switch 78 at the end of an encoding period or cycle the analog output voltage at terminal 40 can be transferred to capacitor 30 and be retained to appear on analog output terminal 82. In FIGURE 2 the programmer 66 of the converter may be synchronized with the digital pulse input by means of an appropriate synch input to terminal 86.

The foregoing description is directed to a first mode of operation which for simplicity may be referred to as straight conversion. The novel converter of the present invention also contemplates a second mode of operation hereinafter referred to as delta or differential conversion. In the second mode of operation the desired binary code for analog to digital conversion represents the change in analog input voltage which has occurred since the last encoding.

Referring to the prior description of the first mode of operation it is noted that at the end of any encoding period or cycle the voltage across capacitor 42 of FIGURE 1 is equal to the analog input voltage at the beginning of that encoding ($\pm 1$ bit). If a new encoding is performed without discharging capacitor 42, that is without operating switch 44 labelled $S_{1a}$, the binary output represents not the new sample stored on capacitor 30 but rather the voltage that must be added to or subtracted from that left on capacitor 42 from the previous encoding to make it equal to the new voltage on capacitor 30.

Stated differently, during each encoding cycle the switches are controlled by the programmer and comparator decisions in such a way as to make the voltage on capacitor 42 equal to that on capacitor 30 by adding a charge to capacitor 42 in binarily decreasing steps. In the second or differential mode of operation capacitor 42 is never discharged and each output pulse train code then indicates the change in voltage on capacitor 30 caused by the operation of ganged switches 22, 26 and 28 and consequently the change in analog input voltage between successive encoding periods or cycles.

The differential mode or mode 2 of operation is illustrated by the last curve in FIGURE 3 which represents the voltage across capacitor 42 for differential analog to digital conversion. As can be noted at the beginning of the first encoding period at the time of pulse 90 switch 44 is not closed but remains open and capacitor 42 is not discharged but remains at its final voltage level. In order to reduce the effects of leakage currents, circuit unbalances, occasional circuit malfunctions, and transmission errors, it is desirable to connect a resistor across capacitor 42. The time constant of this resistor and capacitor 42 must be long in comparison with an encoding cycle. The voltage across capacitor 42 then changes in binarily decreasing steps towards the value of the analog input voltage which is again assumed to be that indicated at 110 appearing across capacitor 30. A voltage approximately equal to this value with an accuracy determined by the desired number of bits is indicated at 138. During the second encoding period initiated at the time of pulse 94 the voltage across capacitor 42 remains the same and again is not discharged. This second encoding cycle again produces binarily decreasing changes in the voltage towards the value 122 of the potential across capacitor 30 as indicated at 140. The third encoding cycle beginning at the time of pulse 98 again involves no discharge of capacitor 42 and no closing of switch 44 and the voltage across capacitor 42 remains at the 140 level.

It is also possible to utilize the circuit of FIGURE 2 for differential conversion of a digital input to an analog output. Again for differential conversion switch 44 is not used. As before in order to reduce the effects of leakage currents, circuit unbalances, occasional circuit malfunctions, and transmission errors, it is desirable to connect a resistor across capacitor 42. The time constant of this resistor and capacitor 42 must be long in comparison with a decoding cycle. In all other respects the operation of the circuit of FIGURE 2 is identical to that previously described and since capacitor 42 is not discharged the change in analog output appearing at terminal 82, that is transferred to capacitor 80 by way of switch 78, is representative of the digital input train for that encoding period.

Figure 4:
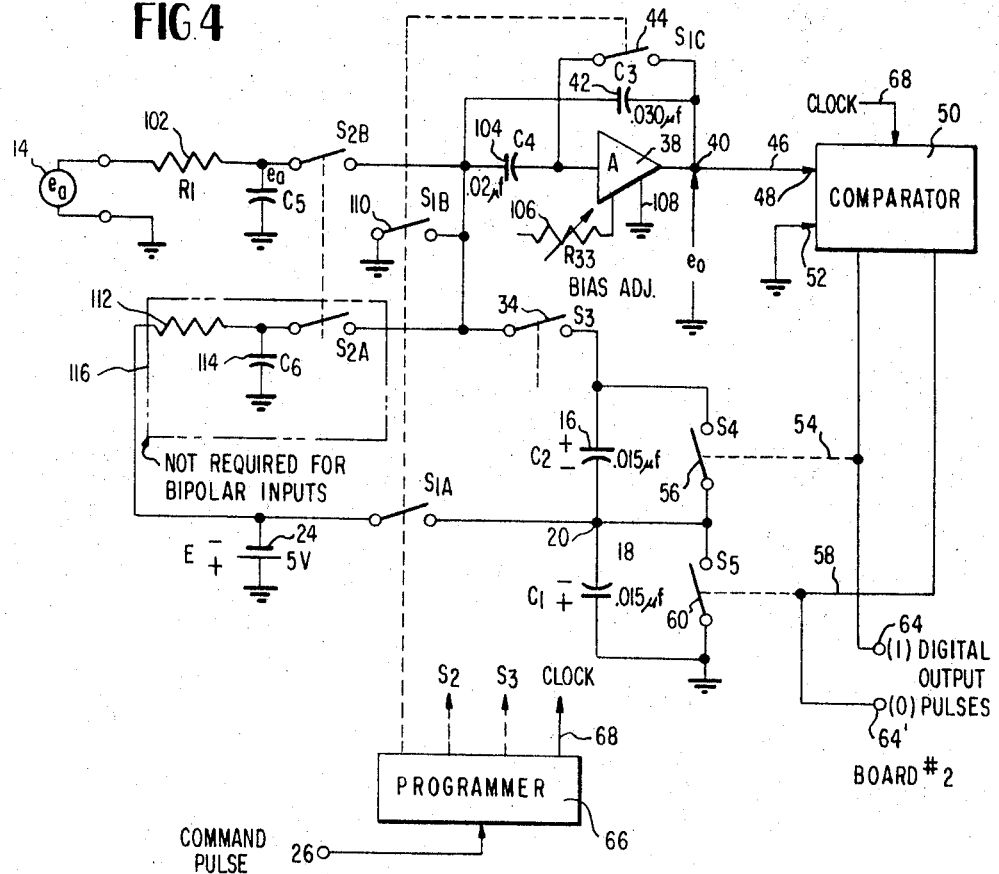
FIGURE 4 is a block diagram of a modified analog to digital converter constructed in accordance with this invention.
Figure 5:
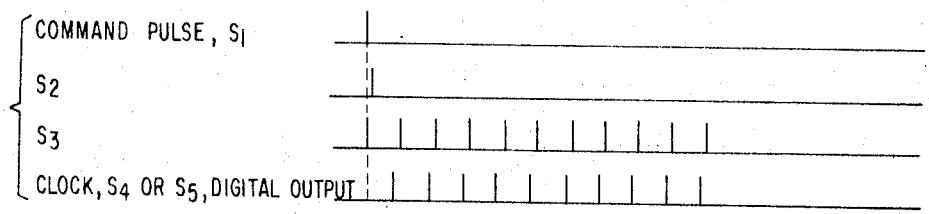
FIGURE 5 is a timing diagram for the converter of FIGURE 4.

FIGURE 4 shows a modified embodiment of the converter of the present invention with typical component values indicated and with like parts bearing like reference numerals. FIGURE 5 is a timing diagram for the converter of FIGURE 4. This circuit is similar to the analog to digital converter of FIGURE 1, with the exception that the analog input voltage is impressed directly upon the feedback capacitor 42 of the operational amplifier and this analog sample passes through an input resistor 102 and an input capacitor labelled $C_5$. Another important difference in the circuit of FIGURE 4 is the provision of an input capacitor labelled $C_4$ which constitutes the input capacitor of the operational amplifier. In addition to capacitor 104 the operational amplifier comprises a high-gain amplifier 38 and feedback capacitor 42. A bias adjustment resistor or variable resistor 106 is provided for the amplifier 38 and the internal amplifier ground is illustrated at 108.

Capacitor 104 compensates for imperfections in amplifier 38 and in effect counteracts the input bias error of the amplifier. Capacitor 104 would not be necessary if amplifier 38 were a perfect amplifier but the provision of input capacitor 104 makes it possible to utilize a less than perfect, and in fact a much cheaper amplifier than heretofore usable in this type of circuit. Switch 110 labelled $S_{1b}$ is a discharging or shorting switch for capacitor 104 and discharges this capacitor at the start of each encoding period.

A resistor 112, capacitor 114 and cooperating switch $S_{2a}$ are provided to handle uni-polar analog sources. These elements enclosed in dashed box 116 are not required when converting bi-polar analog inputs.

In the operation of the circuit of FIGURE 4, the occurrence of a command pulse as illustrated in the first line in FIGURE 5 starts an internal programming cycle which controls switches $S_1$, $S_2$, $S_3$ and triggers the comparator which in turn operates switches $S_4$ and $S_5$. Gang switches $S_{1A}$, $S_{1B}$ and $S_{1C}$ are referred to collectively as switch $S_1$ and gang switches $S_{2A}$ and $S_{2B}$ are referred to collectively as switch $S_2$. The programmer includes a bit rate clock and a counter to turn itself off after a given number of clock pulses (bit intervals).

Amplifier 38 labelled A is part of the operational amplifier system with capacitor $C_3$ connected from its output terminals to the junction of $S_{2b}$, $S_{1b}$, and $C_4$ so that it functions as a charge storage circuit. The junction of $S_{2b}$, $S_{1b}$, and $C_4$ is held at ground potential by feedback through capacitor 42. All switches are operated by blocking oscillator pulse generators and thus close when triggered, open after a set time, and then remain open until retriggered.

Prior to the occurrence of the command pulse, at time $t_0$, capacitor $C_5$ is charged to the analog input voltage $e_a$. The command pulse causes switches $S_1$ and $S_3$ to close simultaneously, charging $C_1$ and $C_2$ (which are equal) to the reference potential E (illustrated as 5 volts negative), and discharging $C_3$ and $C_4$. At this time the amplifier output voltage $e_0$ becomes zero. $S_1$ remains closed for approximately 20 microseconds.

At $t=t_0+20$ microseconds, switch $S_2$ closes discharging $C_5$ and $C_6$ into $C_3$. The charge flows into capacitor $C_3$ (42) and the voltage at the amplifier output, $e_0$, changes to $e_0 = -K(e_a - e_b)$. The voltage $e_b$ is an offset bias contributed by the charge from capacitor $C_6$ which is used only when the analog input is uni-polar.

Next the clock triggers the comparator. If $e_0$ is positive $S_5$ is closed by the comparator, if $e_0$ is negative, $S_4$ is closed. Thus either $C_1$ or $C_2$ is discharged when the comparator is triggered, depending upon the polarity of the voltage $e_0$ of the amplifier.

As soon as $S_4$ or $S_5$ is open, $S_3$ is closed. This causes equal capacitors $C_1$ and $C_2$ to both charge to $E/2$ and causes a step in voltage at the amplifier output of $\pm K(E/2)$. The $-$ sign corresponds to a binary 0 in the most significant digit and the $+$ sign corresponds to a binary 1.

The sequence of clock pulses operating $S_4$ or $S_5$ followed by operations of $S_3$ causes the voltage at the amplifier output $e_0$ to change according to a quasi-binary series which converges toward zero. The signs of the terms in the series represent the digital equivalent of the amplitude of the analog input signal. Plus signs represent binary 1's and minus signs represent binary 0's. The serial binary digital output signals are brought out to two separate output terminals 64 and 64', one terminal for binary 1's and the other terminal for binary 0's.

It should be noted that in FIGURE 4 the input node to amplifier 38 is a virtual ground when switch 44 is closed, and also the left hand terminal of $C_4$ goes to ground potential when switch $S_{1b}$ is closed. Therefore both $C_3$ and $C_4$ are discharged when $S_{1b}$ and $S_{1c}$ are closed. The dashed line in FIGURE 5 shows the time relationship between $S_1$ and $S_2$. They do not operate simultaneously but rather $S_2$ closes on the trailing edge of the blocking oscillator pulse whose leading edge closes $S_1$.

It is apparent from the above that the present invention provides a novel electronic converter which can be used by means of a simple switching arrangement for either analog to digital conversion or for digital to analog conversion. Likewise the present invention provides a converter usable for either straight conversion or for differential or delta conversion.

Important features of the present invention include the provision of a simplified converter requiring a minimum number of switches and other components, yet one which retains the advantages of improved accuracy and high speed of operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A signal generator for electronic converters comprising a pair of equal capacitors with adjacent sides connected to a common terminal, a source of reference potential, first switch means coupling said source to said common terminal for charging said capacitors with like polarities on said adjacent sides, an operational amplifier having a feedback capacitor, second switch means for periodically coupling said pair of capacitors in series between ground and the input of said operational amplifier, and third switch means for periodically discharging only one of said pair of capacitors at a time.

2. An analog to digital converter comprising a pair of equal capacitors, means for charging said capacitors to values equal in magnitude at the beginning of an encoding period, an operational amplifier having a feedback capacitor, a programmer, switch means responsive to said programmer for periodically connecting said equal capacitors in series between ground and the input of said amplifier, a comparator, means coupling the output of said operational amplifier to one input of said comparator, means for impressing an analog signal to be converted on the other input of said comparator, and means responsive to the output of said comparator for periodically discharging one of said equal capacitors.

3. A converter according to claim 2 wherein one of said equal capacitors is discharged if the output of said amplifier is greater than said analog voltage and the other of said equal capacitors is discharged if the output of said amplifier is less than said analog voltage.

4. An analog to digital converter comprising a pair of equal capacitors, means for charging said capacitors to values equal in magnitude at the beginning of an encoding period, an operational amplifier having a feedback capacitor, a programmer, switch means responsive to said programmer for periodically connecting said equal capacitors in series between ground and the input of said amplifier, a comparator, means coupling the output of said operational amplifier to one input of said comparator, a storage capacitor, means for impressing a sample of an analog voltage to be converted onto said storage capacitor, means coupling said storage capacitor to the other input of said comparator, and selective switch means responsive to the output of said comparator for discharging one or the other of said equal capacitors so as to successively bring the voltage at the output of said amplifier nearer in value to said analog voltage in binarily decreasing steps.

5. A digital to analog converter comprising a pair of equal capacitors, means for charging said capacitors to values equal in magnitude at the beginning of an encoding period, an operational amplifier having a feedback capacitor, a programmer, switch means responsive to said programmer for periodically connecting said equal capacitors in series between ground and the input of said amplifier, a comparator, means coupling one input of said comparator to a reference potential, means for impressing a digital signal to be converted on the other input of said comparator, and means responsive to the output of said comparator for periodically discharging one of said equal capacitors.

6. A converter according to claim 5 including selective switch means responsive to the output of said comparator for discharging one or the other of said equal capacitors in accordance with the presence or absence of a pulse at each pulse position in said digital signal.

7. A conveter according to claim 6 including switch means coupled to said feedback capacitor for discharging said feedback capacitor at the beginning of each encoding period.

8. A converter according to claim 6 including switch means coupled to said feedback capacitor for discharging said feedback capacitor only after a plurality of encoding periods.

9. A signal generator for analog to digital converters comprising a pair of equal capacitors with adjacent sides connected to a common terminal, a reference potential source, first switch means coupling said source to said common terminal for charging said equal capacitors with like polarities on said adjacent sides, an operational amplifier having a feedback capacitor and an input capacitor, second switch means for periodically coupling said pair of equal capacitors in series between ground and said operational amplifier, third switch means for periodically discharging said operational amplifier input capacitor, and fourth switch means for periodically discharging only one of said pair of capacitors at a time.

10. An analog to digital converter comprising a pair of equal capacitors, means for charging said capacitors to values equal in magnitude at the beginning of an encoding period, an operational amplifier having a feedback capacitor and an input capacitor, first switch means for periodically discharging said feedback and input capacitors, a programmer, second switch means responsive to said programmer for periodically connecting said equal capacitors in series between ground and said input capacitor, a comparator, means coupling the output of said operational amplifier to one input of said comparator, means for impressing a sample of an analog voltage to be converted onto said feedback capacitor, means coupling the other input of said comparator to a reference potential, and selective switch means responsive to the output of said comparator so as to successively bring the voltage at the output of said amplifier near said comparator reference potential in binarily decreasing steps.

11. A signal generator comprising a pair of electric charge storage elements, means for simultaneously producing a reference charge on each of said elements, a third electric charge storage element, means for periodically discharging one of said pair of elements, means for periodically sharing the charge on the other of said pair between said pair of elements, and means responsive to the sharing of charge between said pair of elements for accumulating a charge on said third element representative of the algebraic sum of said shared charge.

12. A signal generator for electronic converters comprising a pair of charge storage capacitors, means for simultaneously producing a reference charge on each of said capacitors, a third charge storage element, means for periodically discharging one of said capacitors, means for periodically coupling said capacitors together in charge sharing relation wherein the remaining charge on the other of said capacitors is shared between said capacitors, and means responsive to the sharing of charge between said pair of capacitors for accumulating a signal on said third charge storage element representative of the algebraic sum of said shared charge.

13. A signal generator for electronic converters comprising a pair of equal capacitors, means for simultaneously producing a reference charge on said capacitors of equal magnitude, an operational amplifier including a third capacitor, means for periodically discharging one of said pair of capacitors, and means for periodically coupling said pair of capacitors in series between a reference potential and the input of said amplifier whereby charge is shared between said pair of capacitors and a charge is developed on said third capacitor representative of the algebraic sum of said shared charge.

References Cited

UNITED STATES PATENTS

| 3,098,224 | 7/1963 | Hoffman | 340—347 |
| 3,140,481 | 7/1964 | Hoffman | 340—347 |
| 3,216,002 | 11/1965 | Hoffman | 340—347 |

MAYNARD A. WILBUR, *Primary Examiner.*

M. K. WOLENSKY, *Assistant Examiner.*

U.S. Cl. X.R.

320—1; 328—151